(12) United States Patent
Ahluwalia et al.

(10) Patent No.: US 10,983,326 B2
(45) Date of Patent: Apr. 20, 2021

(54) SUPER-RESOLUTION IMAGING

(71) Applicants: UNIVERSITETET I TROMSØ—NORGES ARKTISKE UNIVERSITET, Tromsø (NO); UNIVERSITÄT BIELEFELD, Bielefeld (DE)

(72) Inventors: Balpreet Singh Ahluwalia, Tromsø (NO); Mark Schüttpelz, Herford (DE)

(73) Assignee: UNIVERSITETET I TROMSØ—NORGES ARKTISKE UNIVERSITET

(*) Notice: Subject to any disclaimer, the term of this patent is extended or adjusted under 35 U.S.C. 154(b) by 59 days.

(21) Appl. No.: 16/092,724

(22) PCT Filed: Apr. 12, 2017

(86) PCT No.: PCT/GB2017/051034
§ 371 (c)(1),
(2) Date: Oct. 10, 2018

(87) PCT Pub. No.: WO2017/178823
PCT Pub. Date: Oct. 19, 2017

(65) Prior Publication Data
US 2019/0129161 A1    May 2, 2019

(30) Foreign Application Priority Data

Apr. 12, 2016   (GB) ...................... 1606268

(51) Int. Cl.
*G01N 21/64*    (2006.01)
*G02B 21/36*    (2006.01)
(Continued)

(52) U.S. Cl.
CPC ....... *G02B 21/367* (2013.01); *G01N 21/6445* (2013.01); *G01N 21/6458* (2013.01);
(Continued)

(58) Field of Classification Search
CPC ............... G01N 21/64; G01N 21/6445; G01N 21/6458; G02B 21/0004; G02B 21/06;
(Continued)

(56) References Cited

U.S. PATENT DOCUMENTS

| 2003/0058440 A1* | 3/2003 | Scott | G01N 21/6428 356/318 |
| 2008/0032414 A1* | 2/2008 | Zhuang | G01N 21/6428 436/172 |

(Continued)

FOREIGN PATENT DOCUMENTS

| CN | 102879916 A | 1/2013 |
| CN | 102928384 A | 2/2013 |

(Continued)

OTHER PUBLICATIONS

PCT International Search Report and Written Opinion, PCT International Application No. PCT/GB2017/051034, dated Jul. 17, 2017, 17 pages.

(Continued)

*Primary Examiner* — Balram T Parbadia
(74) *Attorney, Agent, or Firm* — McDonnell Boehnen Hulbert & Berghoff LLP (57) ABSTRACT

At least one embodiment relates to an apparatus for super-resolution fluorescence-microscopy imaging of a sample. The apparatus includes an objective lens having a forward field of view, the objective lens being configured to collect light. The apparatus may also include a processing arrangement configured to perform super-resolution fluorescence-microscopy imaging of the sample with the collected light. Further, the apparatus includes a waveguide component located forward of the objective lens and configured to (i) receive light from outside the forward field of view, and (ii) use total internal reflection within the waveguide component to direct excitation light. In addition, the apparatus includes (Continued)

an electronic optical-path control system configured to cause input light of a first wavelength to follow a first optical path corresponding to a first optical mode and also configured to cause input light of the first wavelength to follow a second optical path corresponding to a second optical mode.

21 Claims, 6 Drawing Sheets (51) Int. Cl.
    *G02B 21/16* (2006.01)
    *G02B 27/58* (2006.01)
    *G02B 27/56* (2006.01)
    *G02B 6/02* (2006.01)
    *G02B 6/122* (2006.01)
    *G06T 3/40* (2006.01)
    *G02B 6/12* (2006.01)

(52) U.S. Cl.
    CPC ..... *G02B 6/02004* (2013.01); *G02B 6/02042* (2013.01); *G02B 6/122* (2013.01); *G02B 21/16* (2013.01); *G02B 27/56* (2013.01); *G02B 27/58* (2013.01); *G06T 3/4053* (2013.01); *G02B 2006/12102* (2013.01)

(58) Field of Classification Search
    CPC .... G02B 21/16; G02B 21/365; G02B 21/367; G02B 27/56; G02B 27/58; G02B 6/02004; G02B 6/02042; G02B 6/122; G02B 2006/12102; G02B 21/36; G02B 6/02; G06T 3/4053; G06T 3/40
    See application file for complete search history.

(56) References Cited

U.S. PATENT DOCUMENTS

| | | | | |
|---|---|---|---|---|
| 2009/0237501 | A1* | 9/2009 | Lemmer | G02B 21/16 348/79 |
| 2012/0062722 | A1* | 3/2012 | Sase | G01N 21/6458 348/79 |
| 2012/0092477 | A1 | 4/2012 | Kawano et al. | |
| 2012/0293797 | A1* | 11/2012 | Braeckmans | G01N 21/05 356/246 |
| 2013/0256563 | A1* | 10/2013 | Kalkbrenner | G01N 21/64 250/459.1 |
| 2014/0104680 | A1* | 4/2014 | Berman | G01N 21/6458 359/385 |
| 2014/0321772 | A1 | 10/2014 | Piché et al. | |
| 2014/0333750 | A1 | 11/2014 | Zhuang et al. | |
| 2016/0202465 | A1* | 7/2016 | Sase | G02B 21/16 382/164 |
| 2017/0261419 | A1* | 9/2017 | Glensbjerg | G01N 15/1436 |
| 2017/0351080 | A1* | 12/2017 | Robert | G02B 21/0076 |

FOREIGN PATENT DOCUMENTS

| | | |
|---|---|---|
| DE | 4426968 A1 | 1/1996 |
| EP | 2720075 A1 | 4/2014 |
| EP | 2801854 A1 | 11/2014 |
| EP | 3051276 A1 | 8/2016 |
| JP | WO2015/046440 A1 | 4/2015 |
| WO | 00/63677 A1 | 10/2000 |
| WO | 2016006006 A1 | 1/2016 |

OTHER PUBLICATIONS

Stock, K. et al., "Variable-Angle Total Internal Reflection Fluorescence Microscopy (VA-TIRFM): Realization and Application of a Compact Illumination Device", Journal of Microscopy, vol. 211, Jul. 1, 2003, pp. 19-29.

GB Search Report, GB Application No. 1606268.9, dated Nov. 11, 2016, 5 pages.

Intellectual Property India, Examination Report dated Dec. 14, 2020, issued in connection with Indian Patent Application No. 201817040354, 7 pages.

* cited by examiner

SUPER-RESOLUTION IMAGING

CROSS-REFERENCE TO RELATED APPLICATION

The present application is a national stage entry of PCT/GB2017/051034 filed Apr. 12, 2017, which claims priority to GB 1606268.9 filed on Apr. 12, 2016, the contents of each of which are hereby incorporated by reference.

FIELD OF THE DISCLOSURE

This disclosure relates to apparatus and methods for performing super-resolution imaging of samples. More specifically, but not exclusively, it relates to apparatus and methods for performing direct Stochastic Optical Reconstruction Microscopy (dSTORM) imaging of samples.

BACKGROUND

Optical microscopes are used within histology, cell biology and related fields to view biological samples such as cells. However, the resolving power of optical microscopes is limited due to the diffraction limit of light. This limitation restricts the resolution of visible light microscopy to around 200 to 300 nm. In order to overcome this limit, several techniques have been developed, termed "nanoscopy", "super-resolution imaging", or "super-resolution microscopy".

These super-resolution imaging techniques allow imaging of a biological sample with a resolution down to around 20 to 50 nm. They are based upon processing light emitted from photo-switchable fluorophores or quantum dot markers that have been attached to, or embedded within, the biological sample. Examples of such super-resolution techniques include Stochastic Optical Reconstruction Microscopy (STORM), direct Stochastic Optical Reconstruction Microscopy (dSTORM), Photoactivated Localization Microscopy (PALM), Super-Resolution Optical Fluctuation Imaging (SOFI), and Entropy-Based Super-Resolution Imaging (ESI).

Figure 1:
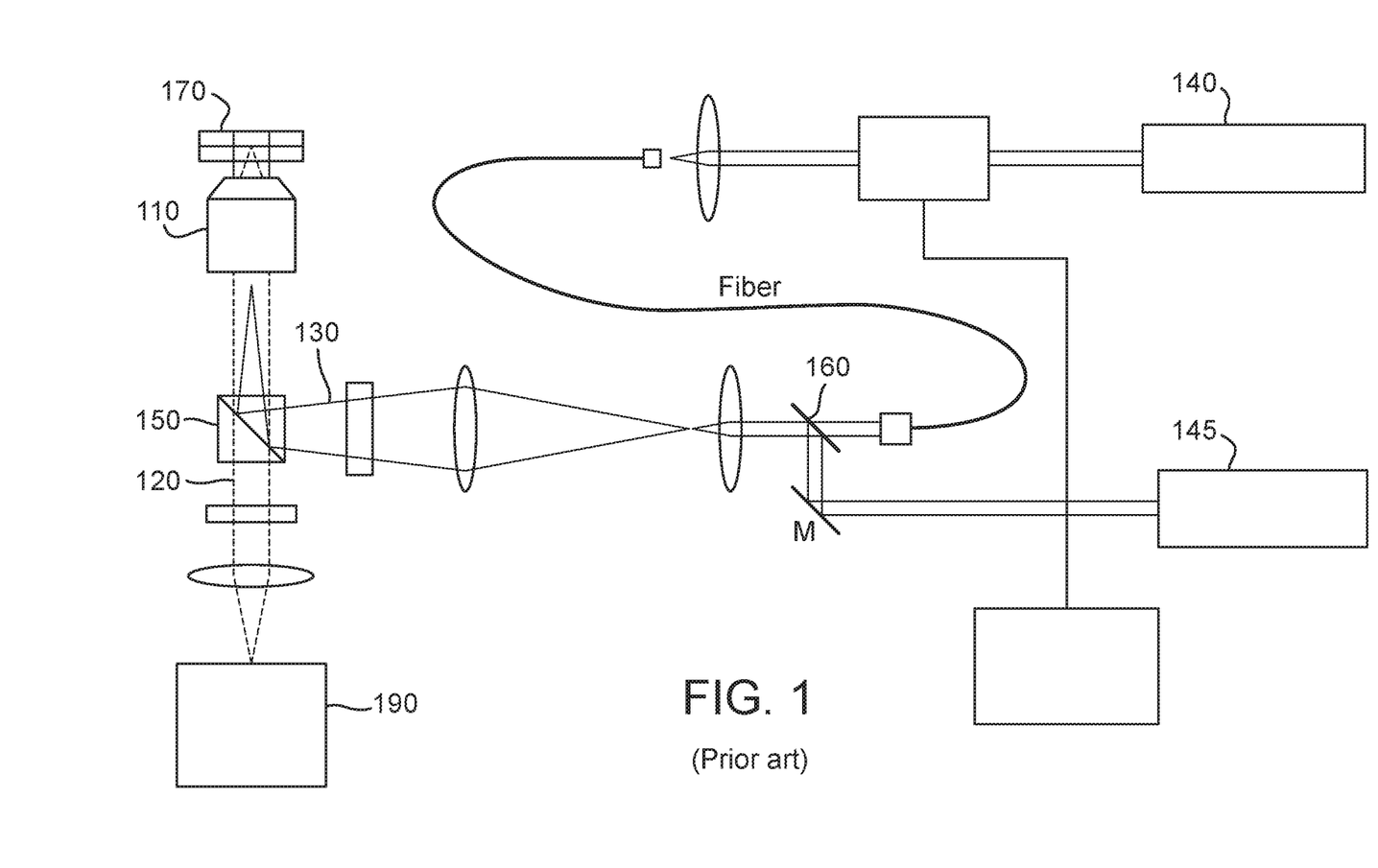
FIG. 1 is a schematic of a prior-art set up for performing fluorescence microscopy.

FIG. 1 shows an example prior-art arrangement for super-resolution imaging, such as dSTORM imaging. The arrangement comprises a first laser light source 140, a second light source 145, a first beam splitter 160, a second beam splitter, 150, an objective lens 110 having a resolution of around 250 nm at the relevant wavelengths (e.g., a high-NA 60× objective lens), a sample 170, and a CCD or sCMOS detector 190. The arrangement also includes means to direct light from the first laser light source 140 to the first beam splitter 160 and to direct light from the second laser light source 145 to the first beam splitter 160. The first beam splitter 160 combines the received laser light from the first and second laser light sources 140, 145 to form an excitation beam 130 and directs the excitation beam 130 to the second beam splitter 150. The second beam splitter 150 directs the excitation beam 130 to the objective lens 110.

To image a particular region of interest in the sample, the excitation beam is directed onto a region of interest of the sample 170 so as to excite the fluorophores in that region. When performing dSTORM two different wavelengths may be used. When fluorophores in the sample region emit light, this is collected and processed in order to generate an image of the region of interest. This is achieved by focusing the objective lens 110 onto the region of interest on the sample 170 so that the excitation beam 130 may be directed onto the region of interest, and so that light emanating from the region of interest can be collected. The second beam splitter 150 functions to filter the collected light 120 from the excitation light 170, and to direct the collected light 120 onto the CCD detector 190. Further filtering may, of course, be performed. A computer (not shown) receives data from the CCD detector 190 and processes the data to determine the positions of the fluorophores by Gaussian-fitting (or another method), to an accuracy greater than the 250 nm resolution of the objective lens.

A problem with the apparatus typically used for super-resolution imaging at present is that it can be expensive, bulky, and cumbersome to set up and operate.

Super-resolution imaging arrangements typically use an objective lens with a high numerical aperture (NA) to illuminate a sample, either with an evanescent field (total internal reflection fluorescence) or with a highly-inclined and laminated optical sheet (HILO).

However, lenses with high numerical apertures (NA) are expensive. They also have a limited field-of-view (FOV) which restricts the field over which fluorescent light can be collected from the sample. This limited field-of-view is around 50 to 250 micrometers in size, which is smaller than the size of typical biological samples, e.g. large cell cultures and colonies, or tissues. This means that the microscope may be repositioned and realigned, relative to the sample, during the imaging, in order to obtain a complete sub-resolution image of the entire biological sample. This is particularly problematic when imaging live cell cultures, since it is not possible to simultaneously image movements involving a first part of the cell culture and second part of the cell culture when the second part of the cell culture is outside the field-of-view. Furthermore, complex image processing may be used to stitch the acquired sub-resolution images together to form a complete sub-resolution image of the entire biological sample.

SUMMARY

Example embodiments may provide apparatuses and methods for performing super-resolution imaging that variously address these shortcomings.

From a first aspect, the disclosure provides an apparatus for super-resolution imaging of a sample, the apparatus comprising:

an objective lens having a forward field of view, the objective lens being arranged to collect light emanating from the sample within the forward field of view;

a processing arrangement arranged to perform super-resolution imaging of the sample with the collected light; and a waveguide component located forward of the objective lens and arranged to (i) receive input light from outside the field of view, and (ii) use total internal reflection within the waveguide component to direct excitation light onto the sample.

From a second aspect, the disclosure provides a method for performing super-resolution imaging of a sample located at least partially within a forward field of view of an objective lens, the method comprising:

receiving input light from outside the field of view into a waveguide component located forward of the objective lens;

using total internal reflection within the waveguide component to direct excitation light onto the sample;

collecting light from the sample with the objective lens; and performing super-resolution imaging with the collected light.

Thus, in accordance with the disclosure, light is supplied to the sample by a waveguide component (which guides light through total internal reflection), instead of being supplied by the objective lens. The objective lens can therefore be optimized for collecting light from the sample, rather than using the same objective lens to both supply excitation light to the sample and collect emitted light from the sample.

The use of a waveguide to excite a sample for super-resolution imaging provides a number of surprising benefits, including enabling the use of an imaging objective lens with a lower numerical aperture than has typically been used in super-resolution imaging, leading to a wider field of view of the sample and lower equipment costs. It also avoids much of the alignment complexity involved in a traditional super-resolution set up, because the waveguide component can supply excitation light onto the sample directly, without including additional components such as beam splitters.

The waveguide component may receive the input light from a light source, such as a laser, which may be located outside the field of view of the objective lens. The waveguide component may receive input light through air or through some other medium such as a fiber optical cable coupled to the waveguide component. The wavelength of the input light may change over time—e.g., by temporal multiplexing between a plurality of different wavelengths. The input light may not pass through the objective lens. The excitation light also may does not pass through the objective lens. The objective lens may have a numerical aperture greater than 0.4; and, in some embodiments, less than 1.49.

The objective lens may have an optical axis which is non-parallel with a direction of an optical path through the waveguide. In some embodiments, the optical axis of the objective lens is substantially perpendicular to a direction of an optical path through the waveguide, or to a planar layer of the waveguide.

Any suitable super-resolution imaging technique may be performed. The super-resolution imaging may be, such that, for at least one wavelength in the collected light, the imaging resolution is finer than the resolution of the objective lens at that wavelength. The resolution of the objective lens will, of course, be limited by the diffraction limit of the lens. The collected light may include fluorescent light emitted by the sample; the super-resolution imaging may be fluorescence microscopy. The super-resolution imaging may comprise a single-molecule localization method or a fluctuating-light-field-based super-resolution technique. The super-resolution imaging may be selected from the group consisting of: Stochastic Optical Reconstruction Microscopy (STORM); direct Stochastic Optical Reconstruction Microscopy (dSTORM); Photoactivated Localization Microscopy (PALM); Super-Resolution Optical Fluctuation Imaging (SOFI); and Entropy-Based Super-Resolution Imaging (ESI). Some embodiments use dSTORM.

The waveguide component may take any suitable form. In some embodiments, it comprises one or more planar layers. The waveguide component may comprise a slab waveguide structure, a rib waveguide structure, a strip waveguide structure, or a multi-core excitation waveguide structure. In some embodiments, the waveguide comprises a waveguide structure monolithically integrated onto a substrate, which may be a planar substrate. The substrate may be silicon. The substrate may have a maximum thickness of less than 200 micrometers, such as 160-170 micrometers. In some embodiments, the substrate may be transparent, to enable light to be collected from the sample through the substrate.

The waveguide component may be arranged to output the excitation light from an output face, the output face being at least partially within the field of view of the objective lens. The output face may be planar. It may be parallel to a direction of a path taken by light within the waveguide component (e.g., when directing excitation light onto the sample as an evanescent field), or it may be inclined (e.g., perpendicular) to a direction of a path taken by light within the waveguide component (e.g., when directing excitation light onto the sample from an output facet as a beam or a sheet).

The waveguide component may be arranged to guide the input light towards the sample along an optical path whose width, in at least one dimension, increases in a direction towards the sample. This can be useful in illuminating a larger area of the sample with excitation light, either indirectly with an evanescent field or directly. This width may increase adiabatically, so that a single mode condition of the waveguide can be maintained (which may be useful for certain super-resolution imaging techniques).

In one set of embodiments, the waveguide component is arranged to direct only excitation light consisting of an evanescent field onto the sample. The sample may be in contact with the waveguide component. The waveguide component may comprise a first core region and a first cladding region in contact with the first core region, the first core region having a higher refractive index than the first cladding region and being arranged to define a first-core optical path through the waveguide, wherein the first cladding region is shaped to define a sample well for holding the sample.

The sample well may comprise one or more walls—particularly, four planar sidewalls. The sample well may be coated with a bio-compatible layer, e.g., comprising BSA (bovine serum albumin), PEG (polyethylene glycol), or PLL (poly-L-lysine) molecules.

In another set of embodiments, the waveguide component is arranged to output the excitation light from an edge facet of the waveguide component. The sample may be in contact with the edge facet, or there may be a medium, such as an air gap and/or a cell buffer solution (e.g., phosphate-buffered saline, PBS), between the edge facet and the sample. Again, the waveguide component may define a sample well for holding the sample. This sample well may comprise one or more sidewalls. At least one of these sidewalls may comprise at least one waveguide layer. The edge facet may form at least part of one sidewall of the sample well. Accordingly, a received sample may be illuminated in a direction transverse, e.g., perpendicular to the optical axis of the objective lens. The edge facet may be coated with a bio-compatible layer, e.g., comprising BSA (bovine serum albumin), PEG (polyethylene glycol), or PLL (poly-L-lysine) molecules.

Such arrangements enable fluorophores to be excited beyond a surface region of the sample—e.g., deeper than one micrometer into the sample.

Such arrangements also allow fluorophores to be efficiently excited at relatively high power, for a given laser source, compared with other evanescent-field-based illumination techniques, in which excitation powers are relatively low—typically less than about 10% of the total input light power.

The excitation light from the edge facet may be shaped as a light sheet. The light sheet may intersect the sample in a plane transverse, e.g., perpendicular, to the principal direction of the forward field of view of the objective lens. By generating a light sheet the entire cross section of a sample may be illuminated. The light may also be formed as a beam diverging in the transverse plane more than parallel to an optical axis of the objective lens, or as a beam having uniform divergence.

The thickness of a light beam or light sheet emanating from the edge facet may be less than 500, 1000, or 2000 nanometers. To facilitate this, the waveguide layer may be deposited as a light-transmitting thin film of transparent material. This thin film may have a thickness of less than 1 micrometer.

The edge facet may be positioned lateral to a surface area onto which the sample is positionable.

The divergence of the excitation light from the edge facet may be controlled, at least in a plane parallel to an optical axis of the objective lens. In some embodiments, at least in this plane, the divergence is controlled to be smaller than the natural divergence due to the shape and cross section of the edge facet, which may be planar. Such control may be provided by the edge facet itself, or an area of the waveguide layer in close proximity to the edge facet.

The beam may also be convergent towards a focal point or a line focus within the sample, e.g., on the optical axis. Convergence in a plane parallel to the direction of the optical axis and divergence transverse to the optical axis may be simultaneously established.

The waveguide component may comprise a lenticular lens, a static grating, or an acoustic grating arranged to focus the excitation light. This can enable greater control over what portion of the sample is excited. For the same reason, the waveguide component may be arranged to guide the input light towards the sample along an optical path that tapers in at least one dimension to form a lens for focusing the excitation light. The lens may be an axicon lens. An axicon lens can be used to generate a pseudo-Bessel beam whose central core is thin and non-diffracting for a certain distance. The tapering may be rotationally symmetric—e.g. conical—but it may be wedge-shaped or pyramidal, since such shapes may be easier to fabricate, e.g. using lithography. The lens may be located at the output facet.

A limitation with some super-resolution techniques is that only one small region of the sample can be excited, and thus imaged. The waveguide component in embodiments may include:

a first core region and a first cladding region in contact with the first core region, the first core region having a higher refractive index than the first cladding region and being arranged to define a first-core optical path through the waveguide component; and a second core region and a second cladding region in contact with the second core region, the second core region having a higher refractive index than the second cladding region and being arranged to define a second-core optical path through the waveguide component, wherein the first core region is arranged to direct excitation light onto a first region of the sample, and wherein the second core region is arranged to direct excitation light onto a second region of the sample, different from the first region.

In this way, a sample can be imaged in multiple regions (e.g., parallel slices through the sample), by selectively exciting fluorophores in respective regions. The waveguide component may, of course, comprise further core and cladding regions, so as to be able to direct light onto three, four, or more distinct regions of the sample. Accordingly, it can be possible for the processing arrangement to generate a three-dimensional (3D) model of the sample.

The waveguide component may comprise a well or other holding arrangement for holding the sample.

The apparatus may comprise an electronic optical-path control system arranged to cause the input light to follow a first optical path within the waveguide component at a first time, and to follow a second optical path within the waveguide component, different from the first optical path, at a second time, different from the first time. In some embodiments, the input light does not follow the first optical path at the second time. In some embodiments, the input light does not follow the second optical path at the first time. In a multi-core embodiment, these first and second optical paths may correspond to the first-core optical path and the second-core optical path respectively; alternatively, they may be different paths within a single core. The first time and the second time may both be within a single-frame exposure period—i.e., the exposure time for a single frame (e.g., when using a single-molecule localisation technique such as STORM or dSTORM). Alternatively, the first time may be within an exposure period for a first frame, and the second time may be within an exposure period for a second frame, different from the first frame (e.g., when using a fluctuating-light-field-based technique such as ESI or SOFI). This may be useful in embodiments arranged to excite the sample with an evanescent field, as the first and second optical paths may correspond to different respective optical modes within the waveguide component. The pattern of the evanescent field will therefore differ between the optical modes. By generating multiple such patterns within one single-frame exposure period, a more uniform average excitation of the sample can be achieved over the exposure period when using a single-molecule localisation technique, compared with using just one mode throughout. If the sample is not excited uniformly over the single-frame exposure period, the resulting super-resolution image may miss important details or contain artifacts such as stripe patterns. Alternatively, by generating different patterns in the exposure periods of different respective frames, a suitable fluctuation in the illumination can be achieved for use with a fluctuating—light-field-based super-resolution technique. In this case, each pattern (mode) may be constant during a given single-frame exposure period.

The processing arrangement may be configured to generate one frame using light collected over an exposure period having a duration of around 1, 5, 10, 100, 1000, or 10,000 milliseconds. A frame may be stored in a memory of the processing arrangement (e.g., as an array).

The processing arrangement may be configured to generate a plurality of frames—e.g., 100, 1000, 10,000, or more—and to use these to generate one or more super-resolution output images or animations (e.g., using a conventional super-resolution technique, as referred to above). Such an output image or animation may be stored in a memory and/or displayed on a display such as a computer monitor. The frames may all have the same duration of exposure period.

The processing arrangement may comprise any suitable processor, such as any one or more of: a microprocessor, a microcontroller, an ASIC, an FPGA, a DSP, a memory, and a memory containing software instructions. It may comprise a local device, such as a desktop PC, or a remote device, such as a server, or it may be distributed, such as comprising a cloud of servers. From further aspects, the disclosure includes software, and a tangible medium bearing software, comprising instructions for instructing a processing arrangement to carry out any of the steps described herein, including, for example, controlling a light source and/or controlling a light-injecting device and/or generating a super-resolution image using light collected from the sample.

The optical-path control system may be arranged to cause the input light to cycle between the first and second optical paths (and optionally further optical paths) multiple times within the exposure period for a single frame—for example two, ten, a hundred, or more times. This is beneficial when using certain super-resolution techniques, for example, in dSTORM-on-chip experiments, it is enables more than one mode to be excited within a single image frame. For fluctuating-light-field-based super-resolution techniques, one mode per image frame may be used.

The apparatus may comprise a light-injecting device arranged to inject input light into the waveguide component, such as a fiber optic cable, a lens, or a mirror. The light-injecting device may be controlled by the processing arrangement. The optical-path control system may comprise an actuator arranged to move the light-injecting device relative to the waveguide component during a single-frame exposure period, or from one single-frame exposure period to the next, so as to change a position or an angle at which the input light enters the waveguide component (e.g., at an entry facet of the waveguide component). Moving a lens part or an entire objective lens can lead to different parallel offsets, different angles of incidence or different focus positions in time. The actuator may comprise a piezoelectric actuator or vibration motor, such as a vibrating piezoelectric stage, which may be coupled to the light-injecting device. The actuator may comprise an acousto-optic grating, which may extend in a plane parallel to a propagation direction of the input light, for example in a top, bottom or side surface of a waveguide that serves to couple light into the waveguide component; by changing the frequency of a modulating signal, different gratings and different deflections may be generated, thus moving the input light beam in relation to an entry facet of the waveguide component.

The optical-path control system may comprise an arrangement to change one or more of the polarization, phase, or wavelength of the input light during a single-frame exposure period, or from one single-frame exposure period to the next. It may, for example, comprise a rotatable polarizer, or a phase changing device such as a rotating disc or movable slab having different thickness on different locations to provide a varying optical path length. The optical-path control system may comprise a temperature-changing element arranged to change a temperature within the waveguide component and thereby change a refractive index within the waveguide component during a single-frame exposure period or from one single-frame exposure period to the next.

The applicant has also devised another way to achieve a varying excitation field from an evanescent field, which may not require making changes to the input light within or between the single-frame exposure periods. This is achieved by directing light to simultaneously follow a first optical path through the waveguide component and a second optical path through the waveguide component, the first optical path corresponding to a first optical mode of the waveguide component and the second optical path corresponding to a second optical mode of the waveguide component, so as to cause the first and second optical modes to interfere. This interference causes the intensity of the evanescent excitation light to modulate while the imaging takes place. Such illumination has been found to be well suited to fluctuating-illumination-based super-resolution analysis such as SOFI and ESI.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain embodiments will now be described, by way of example only, with reference to the accompanying drawings, in which.

DETAILED DESCRIPTION

Figure 2:
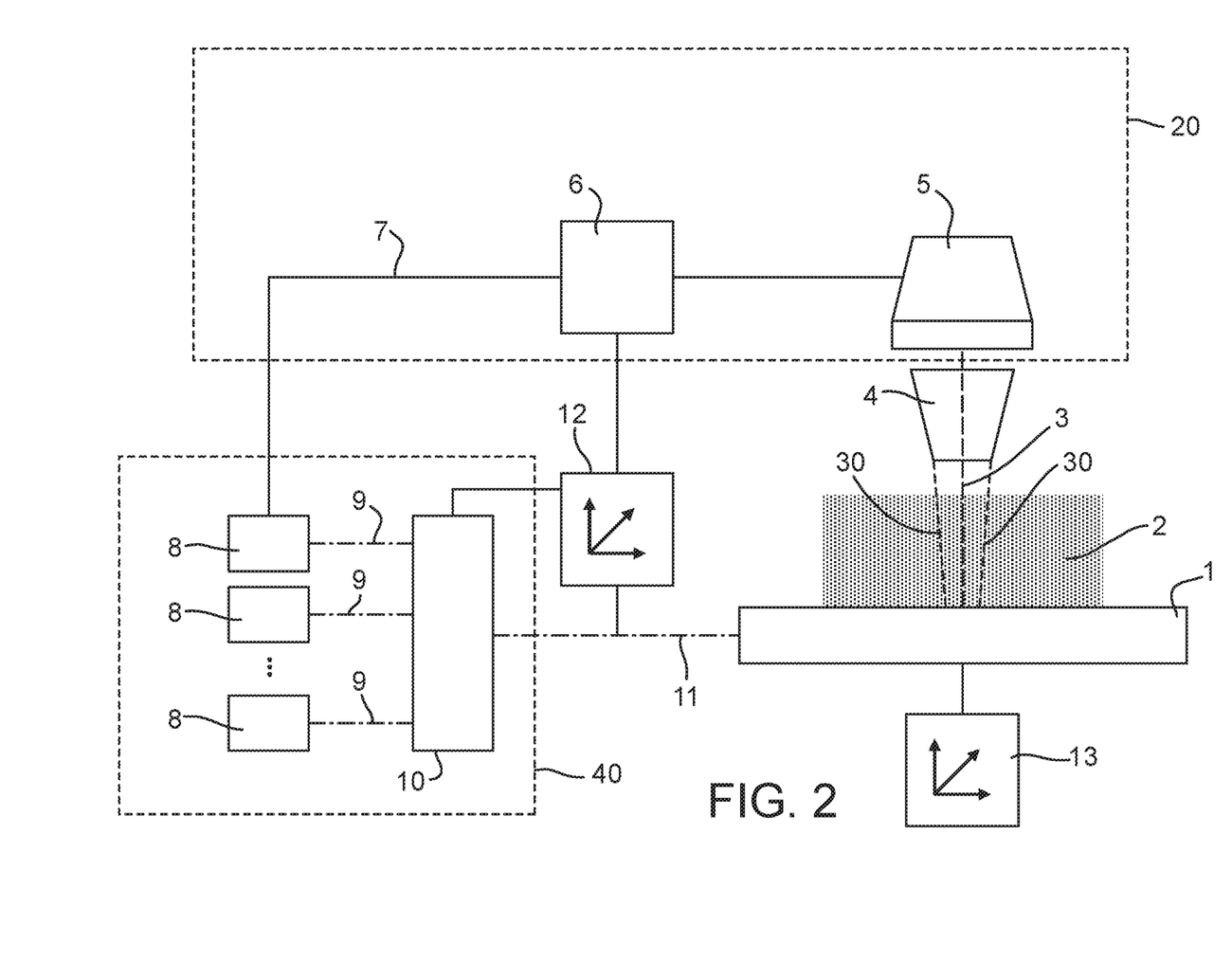
FIG. 2 is a schematic of a set up for performing fluorescence microscopy, according to example embodiments.

FIG. 2 shows an apparatus for performing fluorescence microscopy, which includes an objective lens 4, such as a Plan N 20x/0.4 Olympus™ objective lens, having a forward field of view 30 facing a waveguide component 1. It also includes a light-injecting device 40 optically coupled to an input facet of the waveguide component 1, and a sample 2 positioned on the waveguide component 1 within the forward field of view 30 of the objective lens 4. The apparatus also includes a processing arrangement 20 configured to receive and process the light collected by the objective lens 4 within the forward field of view 30.

The sample in this example is an organic cell embedded with fluorophores, although other samples may, of course, be used.

The light-injecting device 40 comprises an objective lens 10 for injecting light into the waveguide component 1, an actuator 12, and three light sources 8. The three light beams from the three light sources have wavelengths of 405 nanometers, 488 nanometers, and 647 nanometers, respectively. The objective lens 10 receives the three light beams and focuses the light beams to inject them into the waveguide component 1. The injected light forms input light for the waveguide. Input light having one or more different wavelengths enables single-molecule-localisation super-resolution imaging of the sample 2, e.g. using dSTORM.

The actuator 12 can move the objective lens 10 relative to the waveguide component 1 so as to inject light at different positions into the waveguide component 1, and/or at different angles into the waveguide component 1. Changing the position and/or angle in which light is injected into the waveguide component 1 enables the optical coupling between the light-injecting device 40 and the waveguide component 1 to be finely tuned. In addition, it allows light to be injected into the waveguide component at different positions and/or angles, during the imaging process, to vary the optical path along which injected light propagates along the waveguide component. The optical path along which injected light propagates within the waveguide component corresponds to an optical path defined by an optical mode of the waveguide component 1.

Figure 3:
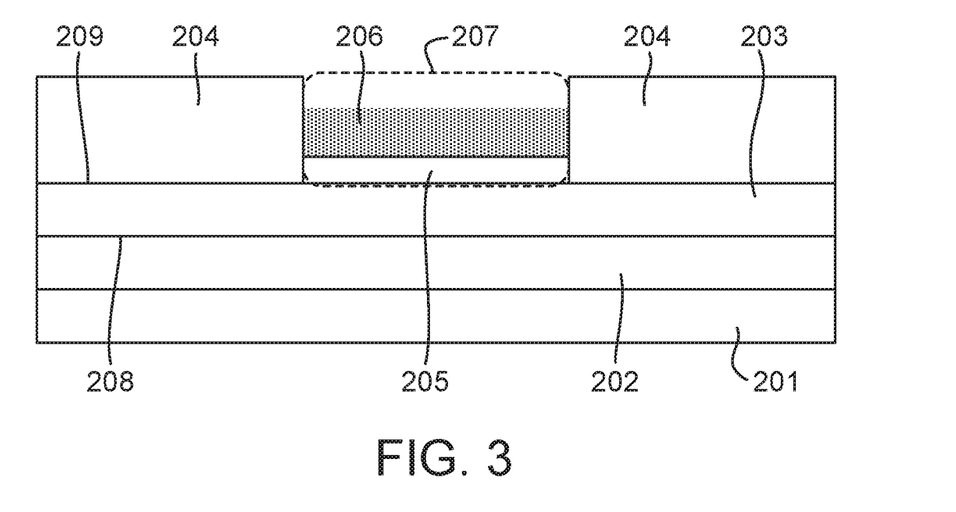
FIG. 3 is a cross-section of a waveguide component, according to example embodiments.
Figure 4:
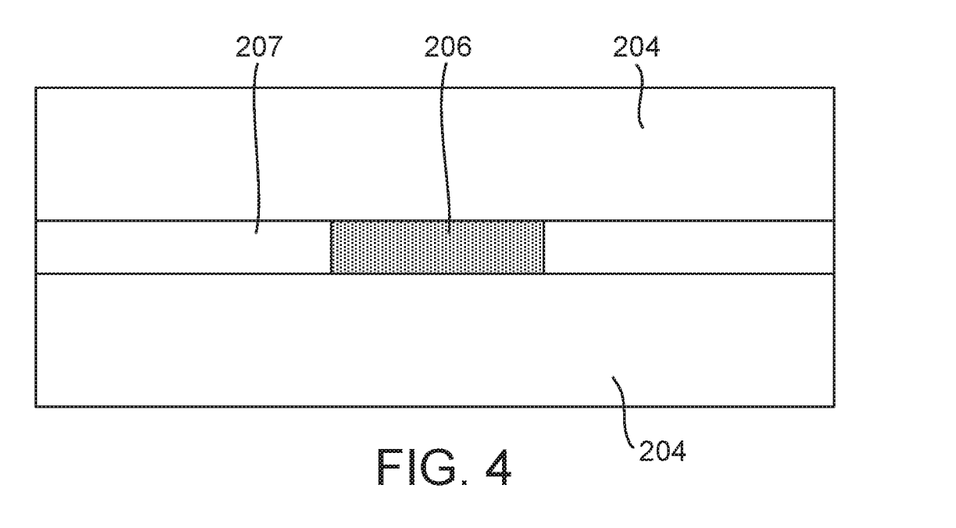
FIG. 4 is a planar view of the waveguide component of FIG. 3, according to example embodiments.

As illustrated in FIGS. 3 and 4, the waveguide component 1 comprises a waveguide structure formed on a substrate 201. The layers of the waveguide structure include an optical guiding layer 203 (sometimes referred to herein as a core layer 203), sandwiched between an upper cladding layer 204 and a lower cladding layer 202. The lower cladding layer 202 is arranged between the substrate 201 and a first face 208 of the core layer 203. The upper cladding layer 204 is arranged on a second face 209 of the core layer 203 which is opposite to the first face 208 of the core layer 203. The core layer 203 has a higher refractive index than the cladding layers and guides light injected into the waveguide component 1.

Figure 6A:
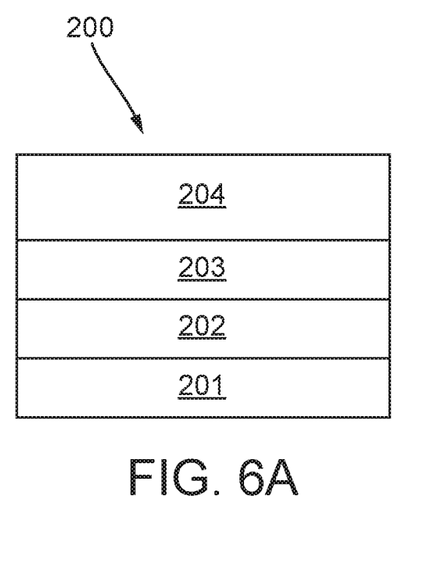
FIG. 6A is a cross-sectional profile of an alternative waveguide structure, according to example embodiments.
Figure 6B:
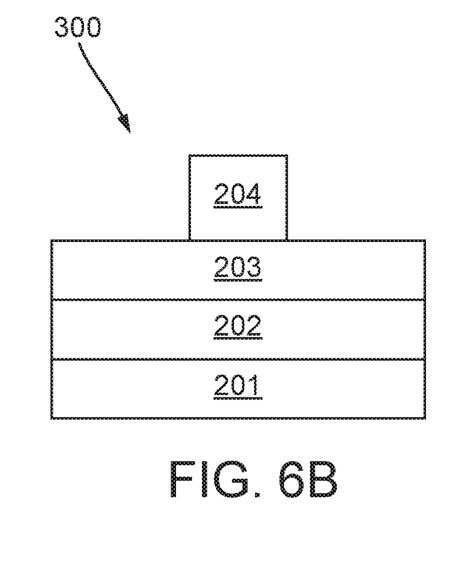
FIG. 6B is a cross-sectional profile of an alternative waveguide structure, according to example embodiments.
Figure 6C:
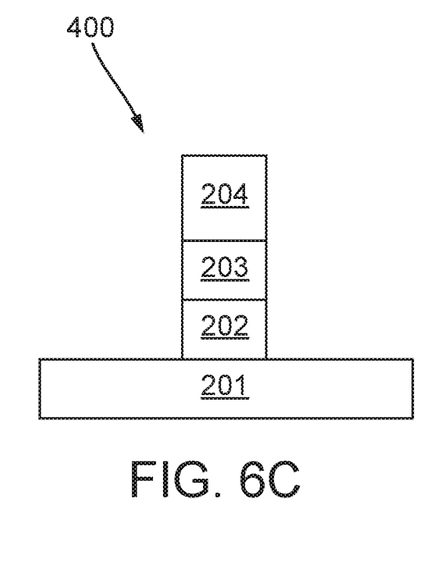
FIG. 6C is a cross-sectional profile of an alternative waveguide structure, according to example embodiments.
Figure 7:
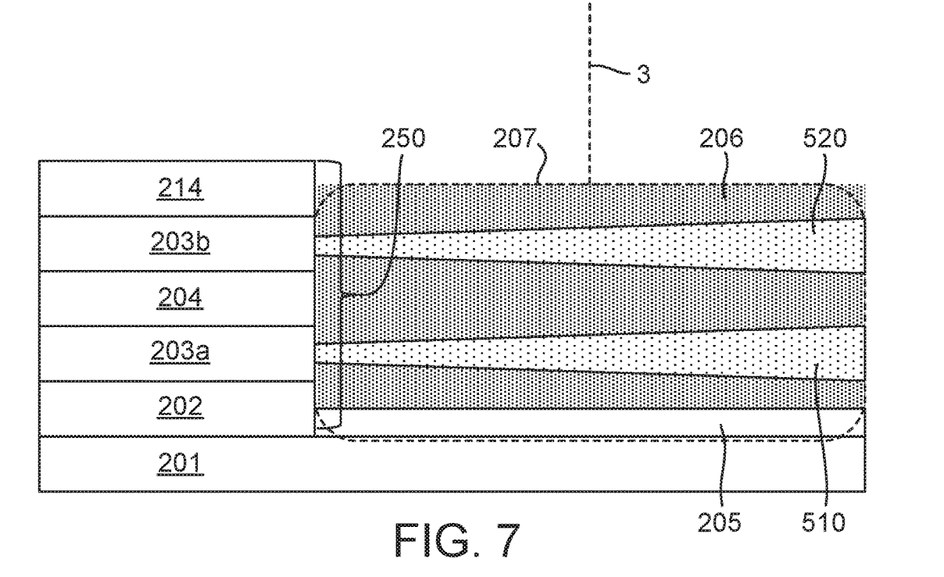
FIG. 7 is a side profile of a multi-core waveguide component, at an end of the waveguide, according to example embodiments.

In this example, the waveguide structure is a slab waveguide (as illustrated in FIGS. 3 and 6A) but, as set out below, the waveguide component could instead comprise a rib (e.g. as illustrated in FIG. 6B), strip (e.g. as illustrated in FIG. 6C), or multi-core excitation (e.g. as illustrated in FIG. 7) waveguide structure.

The slab waveguide structure of FIGS. 3, 4, and 6A may be formed on a silicon or transparent substrate and comprises a thin core layer (e.g., less than 500 nm) of tantalum pentoxide $Ta_2O_5$ or silicon nitride $Si_3N_4$ 203, a lower cladding layer of silicon dioxide $SiO_2$ 202, and an upper cladding layer of silicon dioxide $SiO_2$ 204. The upper and lower cladding may alternatively be of material having a refractive index that matches closely to the refractive index of the sample medium used for the bio-imaging (i.e. n=1.38).

Light injected into the waveguide component 1 propagates along the waveguide component 1 with a portion of the injected light propagating outside the waveguide core region. This portion of light may be referred to as an evanescent field. The intensity in the evanescent field can be increased by making thin waveguides and by using high refractive index contrast between the core and the cladding. Thus, a high refractive index material for the core and lower refractive index material for the cladding (e.g., matched with the medium of the sample) may be used. In addition, the core and cladding material should possess low absorption loss and low auto-fluorescence.

The waveguide component 1 also includes a dock made to hold the sample 206 so that it overlaps with the evanescent field propagating in the waveguide structure. The overlap with the evanescent field ensures that at least a portion of the injected light is directed onto a sample 206 contained within the dock. Light directed onto the sample 206 is referred to herein as excitation light. The face of the waveguide structure from which excitation light is directed onto the sample 206 is referred to herein as an output face.

In the slab waveguide structure, the dock comprises a gap in the upper cladding layer 204 which defines a sample well 207 that overlaps with the evanescent field. The sample well 207 extends at least partially along the length and width of the waveguide component 1.

The processing arrangement 20 includes a fluorescence detection device 5 for detecting light from the sample, such as a CCD or sCMOS camera and an electronic control unit 6 to control the fluorescence detection device 5 and process the detected light to produce a super-resolution image of the sample 206 using super-resolution imaging techniques.

At the start of a super-resolution single-frame exposure period, lasting 10 milliseconds for example, the actuator 12 positions the light-injecting device 40 at a first light-injecting position. At the first light-injecting position, the light-injecting device injects first input light into the waveguide component 1 to follow a first optical path (or a first set of optical paths) within the slab waveguide structure. At least a portion of the injected light following the first optical path or paths propagates as a first evanescent field outside the core layer 203 and is directed into the sample well 207. The first evanescent light directed into the sample well 207 forms a first excitation pattern. The first excitation pattern illuminates the sample 206 in the sample well 207 for a period of approximately 1 millisecond.

After 1 millisecond from the start of the super-resolution single-frame exposure period, the actuator 12 positions the light-injecting device 40 at a second light-injecting position. At the second light-injecting position, the light-injecting device injects second input light into the waveguide component 1 to follow a second optical path (or a second set of optical paths) within the slab waveguide structure. At least a portion of the injected light following the second optical path or paths propagates as a second evanescent field outside the core layer 203 and is directed into the sample well 207. The second evanescent field directed into the sample well 207 forms a second excitation pattern. The second excitation pattern illuminates the sample 206 in the sample well 207 for a period of approximately 1 millisecond.

After 2 milliseconds from the start of the super-resolution single-frame exposure period, the actuator 12 positions the light-injecting device 40 at a third light-injecting position. At the third light-injecting position, the light-injecting device injects third input light into the waveguide component 1 to follow a third optical path (or a third set of optical paths) within the slab waveguide structure. At least a portion of the injected light following the third optical path or paths propagates as a third evanescent field outside the core layer 203 and is directed into the sample well 207. The third evanescent field directed into the sample well 207 forms a third excitation pattern. The third excitation pattern illuminates the sample 206 in the sample well 207 for a period of approximately 1 millisecond.

The actuator 12 then positions the light-injecting device 40 back to the first light-injecting position and the process cycles until the 10-millisecond exposure period ends.

The first, second, and third excitation patterns illuminating the sample 206 stimulate fluorophores in the sample to fluoresce and emit light. The objective lens 4 collects the light emitted from the fluorophores during the entire single-frame exposure period. The light collected during the single-frame exposure period by the objective lens 4 is directed to the fluorescence detection device 5. The fluorescence detection device 5 detects the received light as electrical signals and transmits the electrical signals to the electronic control unit 6. The electronic control unit 6 processes the electrical signals using the dSTORM single-molecule localization method to produce a first image of the sample.

The electronic control unit 6 may comprise any suitable processor, such as one or more of microprocessors, microcontrollers, ASICs, FPGAs, DSPs, memory and memory containing software instructions; it may comprise a single device, such as a desktop PC, or it may distributed such as a remote server or a cloud of servers.

The first image of the sample corresponds to a first frame in the dSTORM super-resolution imaging technique. After the first frame is produced, the apparatus produces a further 10,000 or so frames of the sample. In each of the following frames, the sample is again illuminated with a cycle of the three excitation patterns in turn for the next single-frame exposure period, and so on.

The electronic control unit 6 records the first frame and each of the subsequent frames in memory. After all of the frames have been captured, the electronic control unit 6 produces a final super-resolution image of the sample based on all of the frames using dSTORM super-resolution imaging techniques.

Changing the overlap and direction of the excitation light relative to the sample 206 during a single-frame exposure period may provide better uniformity of the excitation light during the single-frame exposure period. In particular, they have found that, compared to a static optical path, the varying optical paths average out the intensity of the excitation light overlapping with the sample. Better uniformity of the excitation light results in better-quality super-resolution images having better resolution, fewer artifacts, sharper contrasts, and better intensity gamut. In some cases, waveguide-based super-resolution imaging may not be possible at all without this feature, because the illumination patterns is too non-uniform (e.g., having stripes at a similar scale to the structure that is being visualised).

In this example, it will be appreciated that the second face 209 of the core layer 203 overlapping with the sample well 207 forms an output face from which light is directed onto the sample.

The first, second, and third optical paths (or sets of paths) may correspond to different paths defined by different optical modes of the waveguide structure. For example, the first optical path may correspond to the fundamental mode of the slab waveguide structure and the second optical path may correspond to a first order mode of the slab waveguide structure. As another example, the first set of optical paths may correspond to a first set of modes (e.g., the fundamental mode and a first-order mode) of the slab waveguide structure and the second set of optical paths may correspond to a second set of modes (e.g., a first-order mode and a second-order mode) of the slab waveguide structure.

FIG. 2 thus shows a set up for performing fluorescence microscopy such as, for example, dSTORM. The waveguide component 1 supports a sample 2 positioned within the field of view of the objective lens 4. The waveguide component 1 forms a waveguide structure into which light is injected. Injected light is guided by total reflection along the waveguide structure and at least a portion of the injected light propagates as an evanescent light field. The waveguide directs at least a portion of the injected light onto the sample 2.

Optionally, the actuator 12 controlling the movement of the objective lens 10 relative to the waveguide component 1 is controlled by an electronic controller. For example, the actuator may be a piezo stage controlled by piezo controller BPC303 by Thorlabs™.

Alternatively, instead of using an objective lens 10 to inject light into the waveguide component 1, the light-injecting device 40 may inject light into the waveguide component 1 with an optical fiber 11. For example, the light-injecting device 40 may comprise an optical fiber coupler 10 arranged to receive the light beams from each light source, and an optical fiber 11 optically coupled between the optical fiber coupler 10 and the waveguide component 1. The optical fiber coupler multiplexes the different light beams along the optical fiber 11 and focuses the light into the waveguide component 1. Optionally, in this example, the light-injecting device 40 may comprise an actuator 12 in connection with the optical fiber 11 and, as with the arrangement of the actuator in connection with the objective lens 10, the actuator 12 may move the position and/or angle of the optical fiber 11 relative to the waveguide component 1.

Additionally or alternatively, the waveguide component 1 may be connected to an actuator 13 to adjust the position of the light-injecting device 40 relative to the waveguide component 1. Accordingly, this actuator may be used to inject input light into the waveguide component 1 to follow a first and/or second optical path within the waveguide structure during a single-frame exposure period in accordance with the examples of the present disclosure. The actuator 13 may be, for example, a vibrating piezo stage.

Optionally, the light-injecting device 40 may comprise any number of light sources 8 or a single light source 8, such as a single wavelength or a tuneable wavelength light source. Each light source may emit light suited for the excitation of fluorophores, e.g. within the visible spectrum (400 to 800 nanometers) or near-IR (800 to 1500 nanometers). Further, each light source may be a laser light source such as a solid state laser, fiber laser, or diode laser. Additionally or alternatively, each light sources 8 may be a LED light source or any other light source suitable for super-resolution microscopy.

Additionally or alternatively, the input light may have a single wavelength or multiple wavelengths. For example, the input light may comprise 647 nanometer light and 488 nanometer light (the two most commonly used wavelengths for fluorescence imaging).

Alternatively, the light-injecting device may inject first, second, and third input light into the waveguide component 1 at the same time to follow the first, second, and third optical paths (or sets of optical paths), respectively. In this example, the first, second, and third optical paths correspond to the optical paths defined by a first, second, and third optical mode of the waveguide structure in the waveguide component 1. Each of the first, second, and third optical modes are different to each other. Simultaneously propagating first, second, and third optical modes through the waveguide component 1 causes the first, second, and third optical modes to interfere with each other. The interference of different propagating modes may be referred to as mode beating. Beating the first, second, and third modes modulates the excitation light directed onto the sample from the waveguide component 1. Modulating the excitation light in this way may enable the sample to be imaged based on super-resolution imaging techniques adapted for temporally varying excitation light.

Optionally, mode beating can be performed with any number of optical modes propagating in the waveguide structure to modulate the excitation light. For example, mode beating may be performed with only a first and second optical mode propagating in the waveguide structure at the same time.

Optionally, sub-resolution imaging may be performed on a sample comprising quantum dots instead of fluorophores.

In this example, excitation light directed onto the sample simulates the quantum dots to emit light for super-resolution imaging.

Optionally, the processing arrangement 20 may also include one or more filters such as a band filter to filter the light collected by the objective lens 4. For example, the filter may be configured to block light corresponding to the excitation light and transmit light corresponding to the light emitted by the fluorophores.

FIGS. 6A, 6B, and 6c show a cross-section of the layers in three different possible waveguiding structures.

FIG. 6A shows a cross-section of the layers in the slab waveguide structure 200 already described above with reference to FIGS. 3 and 4, but in a region away from the sample well 207.

FIG. 6B shows an optional variant in which lateral optical guiding is provided by having a ridge etched into the upper cladding layer 204 of the waveguide structure to define a rib waveguide structure 300. In a rib waveguide structure 300, the ridge is etched part way through the upper cladding layer 204, but not through the core layer 203. The lateral optical guiding in the rib waveguide structure 300 increases the intensity of the evanescent field directed outside the core layer 203. Accordingly, compared to a slab waveguide structure 200, the intensity of the evanescent field overlapping a sample well 207 defined in a rib waveguide structure 300 is increased, thereby increasing the intensity of the excitation light interacting with the sample 206. Increasing the intensity of the excitation light produces stronger fluorescence.

FIG. 6C shows a further variant in which a further enhancement of the intensity of the evanescent field directed onto a sample 206 is provided by having the ridge additionally etched through the core layer 203 of a waveguide structure to define a strip waveguide structure 400. The lateral optical guiding in the strip waveguide structure 400 increases the intensity of the evanescent field directed outside the core layer 203. Accordingly, compared to a slab waveguide structure 200 and a rib waveguide structure 300, the intensity of the evanescent field overlapping a sample well 207 defined in a rib waveguide structure 300 is increased, thereby increasing the intensity of the excitation light interacting with the sample 206. Increasing the intensity of the excitation light produces stronger fluorescence.

In general, a rib waveguide reduces the propagation losses due to reduced sidewall roughness. Rib waveguides also extend the waveguide parameters (such as thickness and width) for single mode conditions. However, light is more tightly confined inside a strip waveguide, allowing sharper bends, turns and reducing the footprint of the waveguide structure. In addition, strip waveguides will have higher intensity in the evanescent field than the rib waveguides for a similar guided power inside both the waveguides. Moreover, usually for given waveguide parameters, a strip waveguide will support more modes than a rib waveguide, unless both the waveguides are made single mode. Depending on the imaging conditions, either slab, rib, or strip waveguide geometries can be used. Rib waveguides may be used if a higher power in the evanescent field is required (as the propagation losses increase significantly for the visible wavelength used for bio-imaging); however, a strip waveguide may be used for fluctuating-light-field-based imaging techniques as it can support more modes. However, slab, rib, or strip waveguide structures can all be used for any super-resolution imaging techniques.

The widths of the slab waveguide structure 200, rib waveguide structure 300, and strip waveguide structure 400 may range from 1 micron to 100 microns.

Optionally, a rib or strip waveguide structure may widen along its length to increase the width of a sample well 207 defined in the upper cladding layer 204. Increasing the width of the waveguide structure broadens the width of the optical light field propagating along the waveguide structure and allows for a larger sample well 207 for holding a sample 206. A larger sample well 207 combined with a wider excitation light field allows a larger sample area to be imaged for sub-resolution imaging.

Figure 5A:
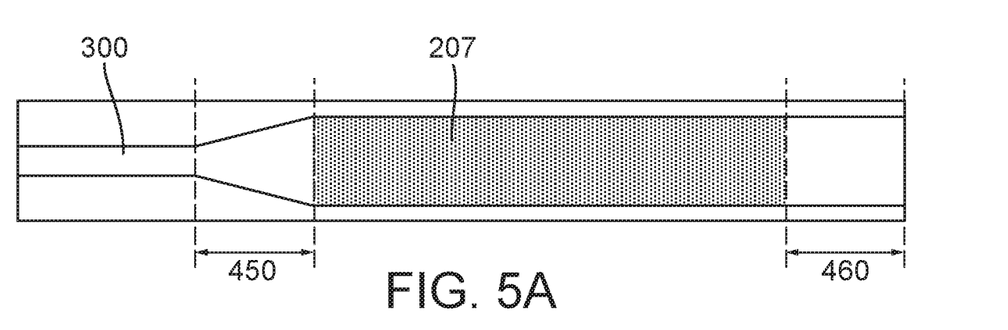
FIG. 5A is a planar view of waveguide components, according to example embodiments.
Figure 5B:
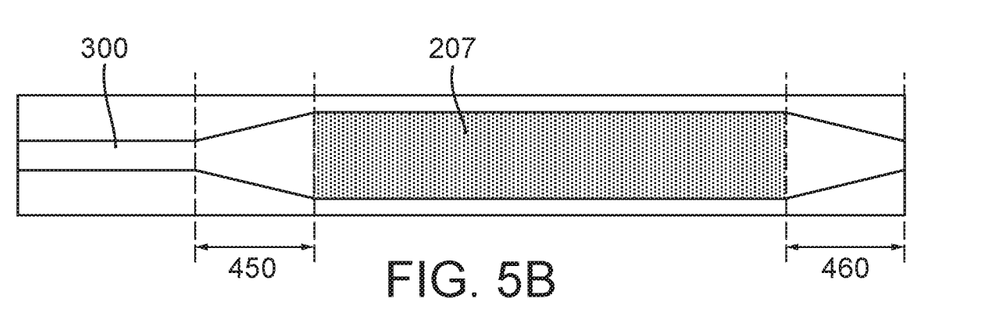
FIG. 5B is a planar view of waveguide components, according to example embodiments.
Figure 5C:
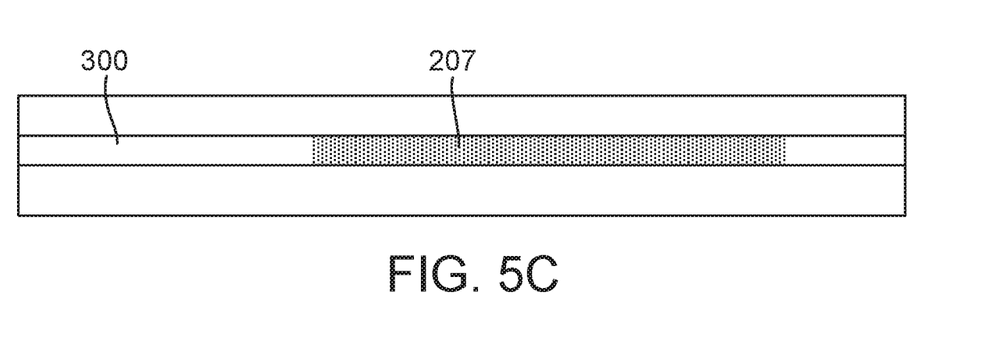
FIG. 5C is a planar view of waveguide components, according to example embodiments.

FIGS. 5A, 5B, 5C illustrate respective plan views of three alternative arrangements wherein a sample well 207 is formed in the upper cladding layer 204 of a rib waveguide structure 300. In FIG. 5A and FIG. 5B, the width of a rib waveguide structure 300 is adiabatically increased to define a larger sample area 207 and broaden the width of the optical light field propagating along the waveguide structure. Increasing the width of the waveguide structure adiabatically can maintain the optical mode profile of the optical light propagating in the region before the adiabatic structure 450. For example, the adiabatic structure 450 maintains the fundamental mode profile of optical light propagating in the waveguide structure leading up to the adiabatic structure.

Optionally, the width of a rib or strip waveguide structure may be tapered after the sample well 207 region, as illustrated at region 460 in FIG. 5b.

The waveguide component 1 comprising a slab waveguide structure may be fabricated using standard semiconductor fabrication techniques. For example, the slab waveguide structure may be fabricated by: first sputtering the lower layer of $SiO_2$ 202 onto the silicon substrate; secondly sputtering the core layer 203 of $Ta_2O_5$ onto the lower layer of $SiO_2$ 202; and then thirdly sputtering the upper layer of $SiO_2$ 204 onto the core layer 203. The sample well 207 may be formed by using photolithography and wet-etching to define a gap in the upper cladding layer 204.

The waveguide component 1 comprising a rib waveguide structure may be fabricated by ion-beam milling the upper cladding layer 204 to define a ridge. The upper cladding layer 204 may be etched to a depth of 200 nm above the core layer 203. Ion beam milling reduces the sidewall roughness of the waveguide and therefore the optical propagation losses within the waveguide structure.

Optionally, the waveguide structure and sample well 207 may be monolithically integrated on the substrate 201 of the waveguide component 1.

Optionally, the waveguide component 1 may comprise a plurality of waveguide structures. Each waveguide structure may receive input light and direct excitation light into a sample well 207. Additionally or alternatively, the waveguide structure may comprise a plurality of waveguide structures and each waveguide structure may receive input light and direct excitation light into one of more of the plurality of waveguide structures.

Before placing the sample 206 into the sample well 207, the waveguide component 1 may be cleaned by submerging the waveguide component 1 in 5% (v/v) Hellmanex™ (from Sigma Aldrich™) for 10 minutes at 70° C. Subsequently, the Hellmanex™ may be removed by firstly submerging it in deionized water, secondly in isopropanol (from Sigma Aldrich™), and thirdly in deionized water.

The sample well 207 may contain a bio layer 205 arranged on the waveguide core layer 203 as illustrated in FIG. 3. The bio layer prevents non-specific binding of fluorophores in the sample to the waveguide core layer 203 and may comprise BSA or PEG. In addition, the bio layer 205 facilitates cultivation of a sample directly within the sample well 207. The bio layer 205 may be used, but is not mandatory. Also, the thickness of the bio layer is selected so as to ensure that the evanescent field still overlaps with the sample in the sample well 207 and is typically less than 20 nm.

Optionally, samples can be prepared directly in the sample well 207 of the waveguide component 1 following standard protocols such as, for example, protocols used for cell attachment to glass coverslips.

The sidewall of the ridge 410 in the strip waveguide structure 400 may define a sample well 207 for holding the sample 206. That is, the sidewall of the ridge may define a sample well 207. In this example, it is the evanescent field propagating outside the core layer 203 at the side of the ridge that is directed onto the sample 206 and overlaps with the sample well 207. Arranging the sample well next to the sidewall of the ridge also benefits from an increased intensity evanescent field interacting with the sample in accordance with the present disclosure. In other words, a sidewall of a waveguide structure may support a sample and thereby form a sample well 207 for receiving a sample. The waveguide component may include other structure for holding the sample.

In an alternative arrangement, an end facet of the waveguide structure defines a sample well 207 for holding the sample 206. That is, the end facet of the waveguide structure may define a sample well 207. In this example, the input light guided along the waveguide component 1 exiting the end facet of the waveguide component 1 is directed onto the sample 206. The sample well 207 may be defined by terminating the waveguide structure down to, or through the substrate layer. Typically, the waveguide structure may be terminated by etching or cleaving the waveguide structure.

FIG. 7 shows an example of an end facet illumination arrangement. The waveguide component 1 comprises a multicore waveguide structure formed on a substrate 201 and a sample well 207 defined by an end facet 250 of the waveguide structure. The end facet 250 of the waveguide structure defines a wall of the sample well 207 and provides a support upon which a sample 206 may be supported.

The layers of the multicore waveguide structure include a first optical guiding layer 203a and a second optical guiding layer 203b (or first core layer 203a and second core layer 203b). The first core layer 203a is sandwiched between an upper cladding layer 204 and a lower cladding layer 202. The lower cladding layer 202 is arranged between the substrate 201 and first core layer 203a. The second core layer 203b is sandwiched between the upper cladding layer 204 and a top cladding layer 214. The first core layer 203a has a higher refractive index than the upper 204 and lower 202 cladding layers. The second core layer 203b has a higher refractive index than the upper 204 and top 214 cladding layers.

The sample well and end facet are formed by a gap etched in the multicore waveguide structure down to the substrate layer 201 such that input light may be guided out of the waveguide structure and into free space, or into a sample, from the each of the cores.

At a first time during super-resolution imaging, the actuator 12 positions the light-injecting device 40 at a first light-injecting position. At the first light-injecting position, the light-injecting device injects input light into the waveguide component 1 to guide the input light through the first core layer 203a of the multicore waveguide structure. The first core layer 203a directs the injected light out of the waveguide structure at a first height and through a first region of the sample well 207.

At a second time during super-resolution imaging, following the first time, the actuator 12 positions the light-injecting device 40 at a second light-injecting position. At the first light-injecting position, the light-injecting device injects input light into the waveguide component 1 to guide the input light through the second core layer 203b of the multicore waveguide structure. The second core layer 203b directs the injected light out of the waveguide structure at a second height and through a second region of the sample well 207. The second height is defined by the position of the second core layer 203b relative to the first core layer 203a. The first region 510 through the sample well 207 is separated from the second region 520 by a separation region into which excitation light is not directed.

The light directed out of the waveguide structure simulates fluorophores in the sample to fluoresce and emit light. Substantially only the fluorophores in the first region 510 of the sample is stimulated by excitation light emanating from the first core layer of the 203a. Similarly, only the fluorophores in the second region 520 of the sample is stimulated by excitation light emanating from the second core layer of the 203b. The volume excited in the sample 206 is essentially confined to the volume of the excitation light emanating from the edge end facet 250 of the waveguide structure.

The emitted light is collected and processed to provide super-resolution imaging as described with reference to FIG. 2. By directing excitation light through different regions of the sample well, the multicore structure enables different regions of a sample 206 in the sample well 207 to be stimulated with excitation light. In particular, the multicore waveguide allows fluorophores located at different heights within the sample to be stimulated and, in this way, emit light from different depths of the sample. Collecting emitted light from different depths of the sample enables super-resolution imaging at different sample depths. It will be appreciated that references herein to heights, depths, widths, etc. are not to be understood as limiting the apparatus to operating in an particular orientation, depending on context.

In summary, in this example, the end facet 250 itself is a part of the sidewall of the sample well 207 and is contacted by the sample 206. For example, light is coupled into the respective waveguiding layer from the left side of FIG. 6 using a suitable coupling technique, for example with an object lens focusing the light to be coupled on the entry face opposite to the end facet 250.

In arrangements where excitation light directed onto the sample 206 emanates from an edge facet 25 of the waveguide structure, the upper cladding layer 204 of the waveguide structure may be air. That is, the layers of the waveguide structure may comprise a lower cladding layer 202 arranged on the substrate 201 and a core layer 203 arranged on the lower cladding layer 202.

Although not shown in FIG. 7, the sample 206 in the sample well may be placed out of contact with the end facet 250 of the waveguide structure rather than in contact with the end facet 250. In this arrangement, the excitation light propagates in free space from the end facet 250 to the sample 206.

Optionally, the sample well 207 in this arrangement may comprise a bio layer 205 deposited at the bottom of the well on top of the substrate 201. The bio-layer 205 prevents non-specific binding of fluorophores in the sample to the substrate layer 201 and may comprise BSA, PEG, or PLL. In addition, the bio-layer facilitates cultivation of a sample directly within the sample well 207. The bio layer 205 may be used, but is not mandatory.

Optionally, the end facet 250 of the waveguide structure is planar.

The excitation light emanating from the end facet 250 of the waveguide structure may be slightly divergent. The divergence of the excitation light is dependent on the width of the waveguide structure at the end facet 250. To reduce the divergence of excitation light directed out from an end facet of a waveguide structure, the width of the waveguide structure may be tapered along its length to form a lens for focusing the excitation light.

Figure 8A:
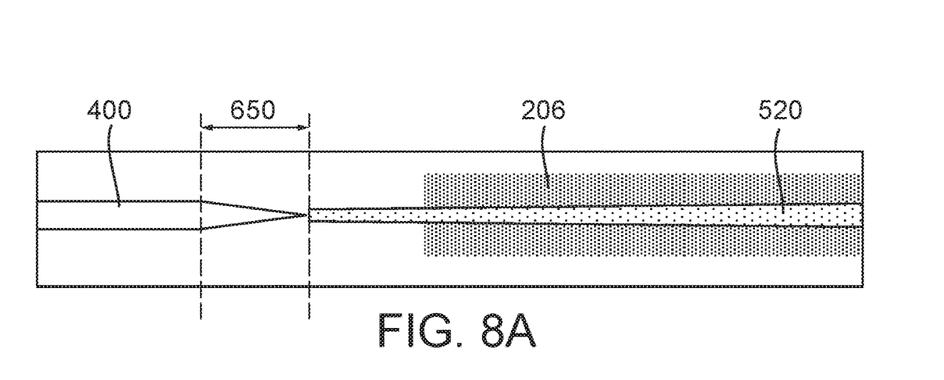
FIG. 8A is a planar view of an edge facet arrangement in a waveguide component, according to example embodiments.

FIG. 8A shows a strip waveguide structure 400 whose width tapers along its length to form a tapered end facet 650. Optionally, the height of the waveguide may also be tapered along its length to define an end facet tapered in two dimensions. Tapering the end facet 650 of a waveguide region to define an axicon lens in a least one dimension may be used to reduce the divergence of the light directed out of the waveguide structure onto the sample 206 (i.e. excitation light). Forming the end region of the waveguide structure as a tapered end facet 650 creates an axicon lens for beam shaping. The axicon lens provides line focus along the propagation direction of the input light through the waveguide structure.

The width of the waveguide structure may be tapered using ion beam milling or any other suitable etching technique to shape the end facet of the waveguide to form a lens according to a suitable mask. Alternatively, the width of the waveguide structure may be tapered using re-growth and selective-growth or any other suitable epitaxial technique to shape the end facet of the waveguide to form a lens. The height of the waveguide structure may also be tapered (e.g. to a point) using suitable etching processes.

Figure 8B:
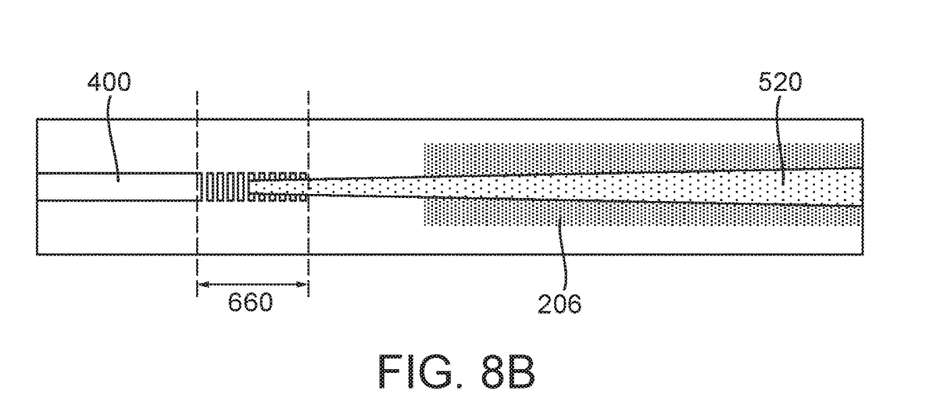
FIG. 8B is a planar view of an edge facet arrangement in a waveguide component, according to example embodiments.

Additionally or alternatively, a grating 660 may be provided to focus light at the end facet of a waveguide structure to reduce the divergence of excitation light directed out from an end facet of a waveguide structure.

FIG. 8B shows a grating 660 arranged at an end facet of a strip waveguide structure. In this example, the grating 660 overlaps the excitation light and reflects the excitation light inwards so as to reduce the divergence of the excitation light and focus the excitation light onto the sample 206. The grating 660 may be etched into one or more layers of the waveguide structure and/or substrate using standard etching techniques.

The end region of the waveguide structure may define a static or programmable acoustic grating 660 in order to deflect excitation light emanating from the waveguide structure in a plane perpendicular to the substrate layer 201 and parallel with the optical axis 3 of the objective lens 4. Consequently, the height of the beam of excitation light emanating from the waveguide structure may be controlled by adjusting the programmable acoustic grating 660.

It will be appreciated that the invention has been illustrated by describing several specific embodiments thereof, but is not limited to these embodiments. Many variations and modifications are possible, within the scope of the accompanying claims.

Any references to prior art contained herein do not constitute an admission that such art forms part of the common general knowledge in any country of the world. The word "comprise", and variants thereof, such as "comprises" and "comprising", are used in an inclusive or open sense (i.e. so as not to preclude the presence or addition of further features), except where the context provides otherwise due to explicit language or necessary implication.

The invention claimed is:

1. An apparatus for super-resolution fluorescence-microscopy imaging of a sample, the apparatus comprising:
   an objective lens having a forward field of view, the objective lens being configured to collect light emanating from the sample within the forward field of view;
   a processing arrangement configured to perform super-resolution fluorescence-microscopy imaging of the sample with the collected light;
   a waveguide component located forward of the objective lens and configured to (i) receive input light from outside the forward field of view, and (ii) use total internal reflection within the waveguide component to direct excitation light onto the sample; and
   an electronic optical-path control system configured to:
      cause input light of a first wavelength to follow, at a first time, a first optical path corresponding to a first optical mode within the waveguide component, so as to illuminate the sample with a first excitation pattern; and
      cause input light of the first wavelength to follow, at a second time, a second optical path corresponding to a second optical mode within the waveguide component, wherein the second time is different from the first time, and wherein the second optical mode is different from the first optical mode, so as to illuminate the sample with a second excitation pattern, different from the first excitation pattern.

2. The apparatus of claim 1, wherein the first time and the second time are within an exposure period for a first frame of the super-resolution imaging, whereby the apparatus is configured to provide a more uniform average excitation of the sample, during the first frame, than would be provided by the first excitation pattern alone.

3. The apparatus of claim 1, wherein the first time is within an exposure period for a first frame of the super-resolution imaging, and the second time is within an exposure period for a second frame of the super-resolution imaging, different from the first frame.

4. The apparatus of claim 1, further comprising a light injecting device configured to inject input light into the waveguide component, wherein the electronic optical-path control system comprises an actuator configured to move the light injecting device relative to the waveguide component so as to change a position or an angle at which the input light enters the waveguide component between the first time and the second time.

5. The apparatus of claim 1, wherein the electronic optical-path control system comprises an arrangement to change a polarization or phase of the input light to have a first value at the first time and a second value, different from the first value, at the second time.

6. The apparatus of claim 1, wherein the super-resolution imaging comprises a single-molecule localization method.

7. The apparatus of claim 1, wherein the super-resolution imaging comprises a fluctuating-light-field-based super-resolution method.

8. The apparatus of claim 1, wherein the waveguide component comprises a rib or strip waveguide structure.

9. The apparatus of claim 1, wherein the waveguide component comprises a first core region and a first cladding region in contact with the first core region, the first core region having a higher refractive index than the first cladding region and being configured to guide light through the waveguide component along one or more optical paths, wherein the first cladding region is shaped to define a sample well for holding the sample.

10. The apparatus of claim 1, wherein the waveguide component comprises a waveguide structure monolithically integrated onto a substrate.

11. The apparatus of claim 1, wherein the waveguide component comprises a first core region, and wherein the first optical path and the second optical path are different paths within the first core region.

12. The apparatus of claim 1, further comprising an imaging sensor arranged to receive the light collected by the objective lens and to generate image data from the light collected by the objective lens to send to the processing arrangement for performing super-resolution fluorescence-microscopy imaging of the sample.

13. A method for performing super-resolution fluorescence-microscopy imaging of a sample located at least partially within a forward field of view of an objective lens, the method comprising:
receiving input light from outside the forward field of view into a waveguide component located forward of the objective lens;
directing input light of a first wavelength to follow, at a first time, a first optical path corresponding to a first optical mode within the waveguide component, so as to illuminate the sample with a first excitation pattern;
directing input light of the first wavelength to follow, at a second time, a second optical path corresponding to a second optical mode within the waveguide component, wherein the second time is different from the first time, and wherein the second optical mode is different from the first optical mode, so as to illuminate the sample with a second excitation pattern, different from the first excitation pattern;
using total internal reflection within the waveguide component to direct excitation light onto the sample;
collecting fluorescent light from the sample with the objective lens; and
generating a super-resolution fluorescence-microscopy image with the collected light.

14. The method of claim 13, wherein the first time and the second time are within an exposure period for a first frame of the super-resolution image, whereby the first and second excitation patterns provide a more uniform average excitation of the sample, during the first frame, than would be provided by the first excitation pattern alone.

15. The method of claim 13, wherein the first time is within an exposure period for a first frame of the super-resolution image, and the second time is within an exposure period for a second frame of the super-resolution image, different from the first frame.

16. The method of claim 13, comprising generating the super-resolution image using a single-molecule localization method.

17. The method of claim 13, comprising generating the super-resolution image using a fluctuating-light-field-based super-resolution method.

18. The method of claim 13, comprising directing input light of the first wavelength along a rib or strip waveguide structure in the waveguide component.

19. The method of claim 13, wherein directing excitation light from the waveguide component onto the sample comprises directing excitation light onto the sample from an edge facet of the waveguide component.

20. The method of claim 13, wherein directing excitation light from the waveguide component onto the sample comprises directing only excitation light consisting of an evanescent field onto the sample.

21. The method of claim 13, further comprising holding the sample in a sample well defined in the waveguide component.

* * * * *